US008517887B2

(12) United States Patent
Chen

(10) Patent No.: US 8,517,887 B2
(45) Date of Patent: Aug. 27, 2013

(54) CLUTCH DEVICE

(75) Inventor: Ting-Kuang Chen, Keelung (TW)

(73) Assignee: Trinity Precision Technology Co., Ltd., Toufen Township (TW)

( * ) Notice: Subject to any disclaimer, the term of this patent is extended or adjusted under 35 U.S.C. 154(b) by 188 days.

(21) Appl. No.: 13/222,305

(22) Filed: Aug. 31, 2011

(65) Prior Publication Data

US 2013/0053208 A1 Feb. 28, 2013

(51) Int. Cl.
*F16H 3/44* (2006.01)

(52) U.S. Cl.
USPC .......................................................... 475/298

(58) Field of Classification Search
USPC .......................................... 475/298, 218, 296
See application file for complete search history.

(56) References Cited

U.S. PATENT DOCUMENTS

| | | | | |
|---|---|---|---|---|
| 6,984,188 B2 * | 1/2006 | Potter et al. | | 475/298 |
| 7,220,211 B2 * | 5/2007 | Potter et al. | | 475/298 |
| 7,223,195 B2 * | 5/2007 | Milbourne et al. | | 475/298 |
| 7,314,097 B2 * | 1/2008 | Jenner et al. | | 173/48 |
| 7,452,304 B2 * | 11/2008 | Hagan et al. | | 475/298 |
| 7,648,125 B1 * | 1/2010 | Huang | | 254/344 |
| 8,220,561 B2 * | 7/2012 | Milbourne et al. | | 173/216 |
| 8,251,158 B2 * | 8/2012 | Tomayko et al. | | 173/47 |
| 8,434,564 B2 * | 5/2013 | Tomayko et al. | | 173/47 |
| 2010/0273598 A1 * | 10/2010 | Kusuda | | 475/149 |

* cited by examiner

*Primary Examiner* — David D Le
*Assistant Examiner* — David J Hlavka
(74) *Attorney, Agent, or Firm* — Wang Law Firm, Inc.; Li K. Wang; Stephen Hsu

(57) ABSTRACT

A clutch device for a power tool includes a case in which a washer, a clutch, a clutch ring, planet gears and a sun gear are installed. The washer is connected with pins to which springs are respectively mounted. When switching and setting the torque by rotating the torque member, the pins do not extend through the clutch. The output torque of the tool is smaller than the input torque of the main shaft, the clutch ring is rotated by the sun gear and the planet gears. The ratchet teeth of the clutch ring are disengaged from the clutch teeth of the clutch. When switching to the drill mode, the pins extend through the clutch and contact with the clutch ring, the motor activates the gear box. Because the clutch ring is fixed by the pins and cannot rotate, the gear box outputs the maximum torque to drill objects.

2 Claims, 6 Drawing Sheets

CLUTCH DEVICE

BACKGROUND OF THE INVENTION

1. Field of the Invention

The present invention relates to a clutch device for a power tool which is capable of switching a torque mode or a drilling mode.

2. The Prior Arts

A conventional output-torque-adjustable power tool, such as a power drill, uses a rotating torque member to set up the torque values and the output modes. The conventional way to achieve the above mentioned torque setting function is to provide a clutch device in the power tool. Thus, when the output torque from the gear box driven by the motor is smaller than the input torque from the main shaft, the clutch device is disengaged and switched to an idle state. When the power tool is switched to the drilling mode, the clutch device cannot be disengaged, thereby providing the maximum output torque.

The conventional clutch device uses beads or rollers to assemble the clutch device within the power tool so that the beads or rollers have to be precisely installed in the power tool. The material for the beads and the rollers are different from that of the clutch. Thus, the wearing for the two different materials is different and it affects the function of the power tool.

Another improved clutch device uses two pins to assemble the clutch device within the power tool. The pins extend through the case of the power tool and insert into the side of the clutch. However, the pins bear a heavy load and do not provide enough support to the clutch device.

SUMMARY OF THE INVENTION

A primary objective of the present invention is to provide a clutch device for a power tool which overcomes the aforementioned disadvantages of the conventional designs that include beads, rollers or pins.

The characteristic of a clutch device for a power tool according to the present invention comprises a washer having multiple pins which are movable to operate a clutch so as to replace beads, rollers or pins of the conventional clutch devices. The numbers of the pins and the apertures in the washer are fixed so that the assemblers cannot miss any of the pins. Moreover, the pins extend through a clutch ring and then connect with the clutch. The clutch ring distributes the forced applied to the pins so as to increase the life of the pins.

The clutch device according to the present invention comprises a case in which a washer, a clutch, a clutch ring, multiple planet gears and a sun gear are installed. The washer includes multiple pins fixed thereon and springs are respectively mounted on the pins. When switching and setting the torque by rotating a torque member, the pins do not extend through the clutch. The output torque from the gear box driven by the motor is smaller than the input torque of the main shaft, the clutch is fixed in the case and the clutch ring is rotated by the sun gear and the planet gears. The ratchet teeth of the clutch ring are disengaged from the clutch teeth of the clutch. When switching to the drill mode, the pins extend through the clutch and contact with the clutch ring, the motor activates the gear box. Because the clutch ring is fixed by the pins and cannot rotate, the gear box outputs the maximum torque to drill objects.

The inside of the case includes multiple axial grooves and the washer, the clutch, the clutch ring are located in the case and restricted by the grooves. The ratchet teeth of the clutch ring are disposed at a side thereof and arranged around a circle. The clutch ring further has inner teeth.

The clutch has multiple notches defined in the outer periphery thereof and multiple clutch teeth disposed at a side facing ratchet teeth of the clutch ring. Each aperture has a pin inserted thereto and the free end of each pin faces the clutch. Each pin has a spring mounted thereto and located between the clutch and the washer. The case further has multiple adjusting members in the through holes thereof and each adjusting member has a protrusion portion and a contact portion on two ends thereof. The contact portions contact with the washer. The case is connected with a first torque member and a second torque member, wherein the adjusting members are engaged with the inner periphery of the second torque member. Thus, the adjusting members axially move when the second torque member is rotated. The inner teeth of the clutch ring are engaged with multiple planet gears which are engaged with a sun gear connected with the motor. The planet gears are driven by the sun gear and drive the transmission gear to output torque.

The present invention sets up the torque or mode by rotating the second torque member. When setting the torque, the pins do not extend through the clutch and the output torque from the gear box driven by the motor is smaller than the input torque from the main shaft, the clutch is restricted in the case and the clutch ring is driven to rotate by the planet gears so that the ratchet teeth of the clutch ring are disengaged from the clutch teeth of the clutch and the clutch device is changed to idle. Thus, the output torque does not exceed a preset value. When the second torque member is switched to the drilling mode, the pins extend through the clutch and contact with the clutch ring. Because the clutch ring is fixed and cannot rotate, the output torque from the gear box is the maximum output torque which is used to drill objects.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
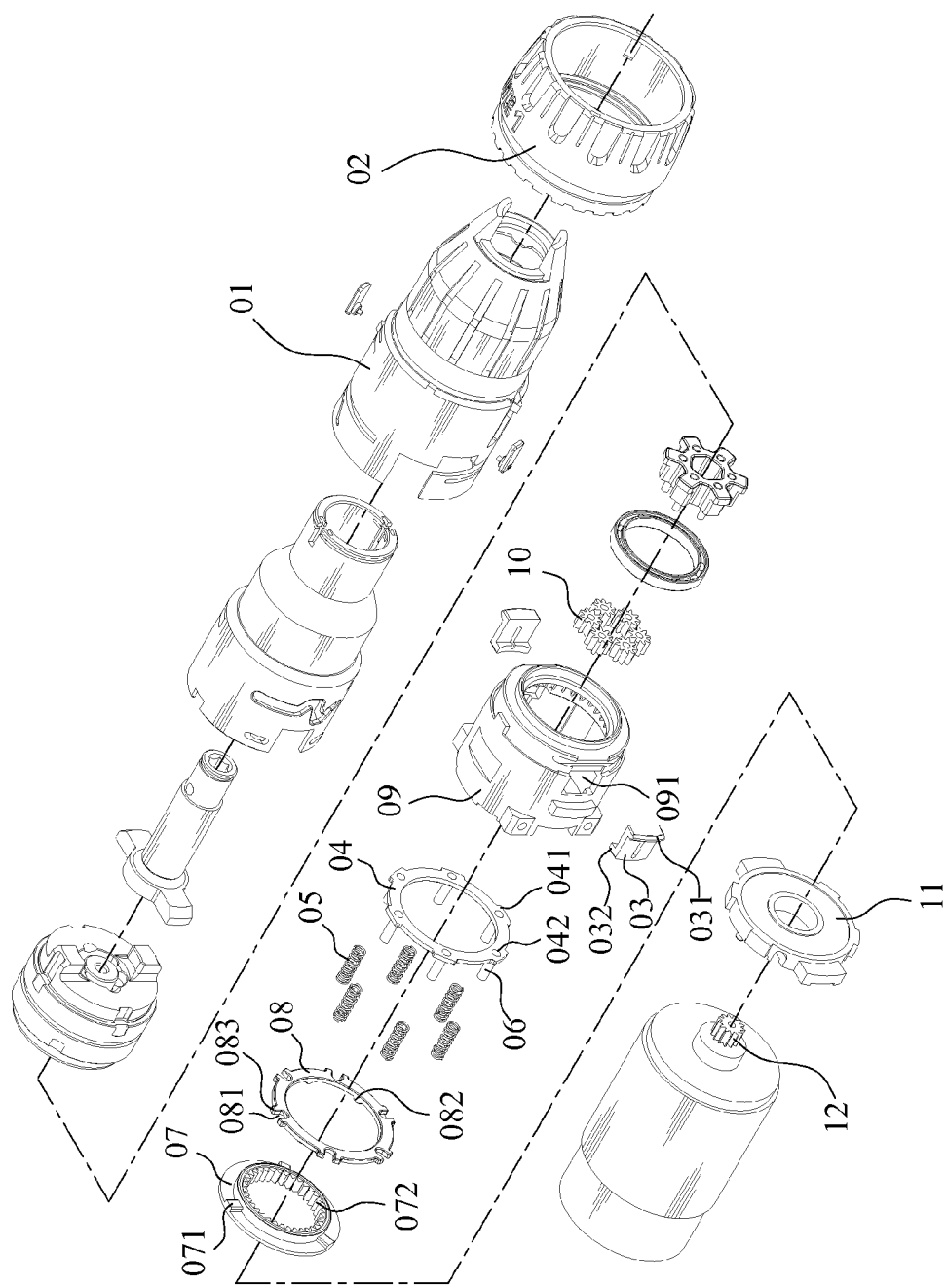
FIG. 1 is an exploded view to show a clutch device according to the present invention.
Figure 2:
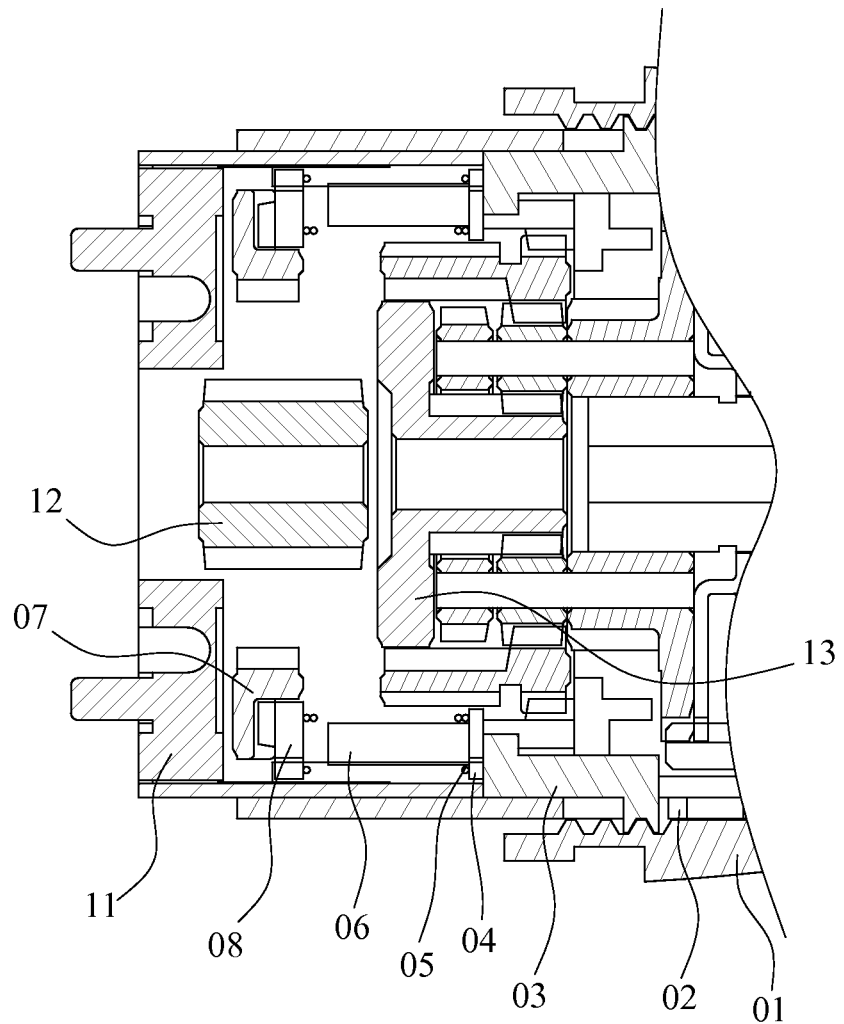
FIG. 2 is a detailed cross sectional view showing the clutch device according to the present invention, wherein pins do not extend through a clutch.
Figure 4:
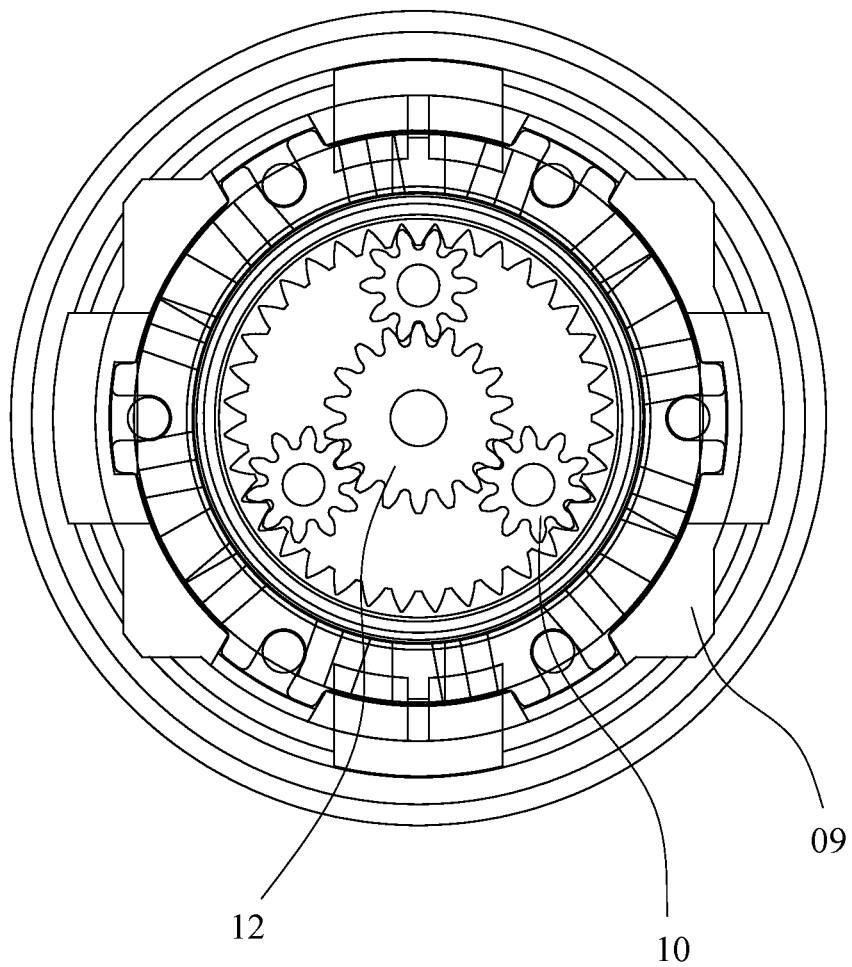
FIG. 4 is a cross sectional view, taken along line IV-IV of FIG. 3.

Referring to FIGS. 1, 2 and 4, a clutch device according to an embodiment of the present invention for a power tool such as a power drill, comprises a case 09, a washer 04, a plurality of pins 06, a plurality of springs 05, a clutch 08, a clutch ring 07, a plurality of adjusting members 03, a first torque member 01, a second torque member 02, a plurality of planet gears 10 and a sun gear 12.

The case 09 has a space defined therein and a plurality of grooves (not shown) axially defined in an inner surface of the case 09. A plurality of through holes 091 are defined through the case 09. In this embodiment, two through holes 091 are located opposite to each other.

The washer 04 is an annular member and axially connected in the space of the case 09. The washer 04 has a plurality of blocks 041 extending from the periphery thereof and corresponding to the grooves of the case 09. A plurality of apertures 042 are defined through the washer 04 and arranged around a circle. Each of the pins 06 has a first end fixed with the aperture 042 and a second end being a free end. Each of the pins 06 has one spring 05 mounted thereto. The blocks 041 of the washer 04 are slid into the grooves of the case 09, thereby connecting the washer 04 with the case 09.

The clutch 08 is an annular plate and axially connected to the space of the case 09. The clutch 08 has a plurality of clutch teeth 082 disposed on a side surface thereof, arranged around a circle and located corresponding to locations of the apertures 042 of the washer 04. A plurality of notches 081 are defined in an outer periphery of the clutch 08 and a plurality of projections 083 extend radially from the outer periphery of the clutch 08 and capable of being engaged with the grooves of the case 09. In this embodiment, the projections 083 of the clutch 08 are arranged in pairs and disposed at both sides of the notches 081. The second ends of the pins 06 face the clutch 08. Both ends of the springs 05 are contacted with the clutch 08 and the washer 04.

The clutch ring 07 is an annular plate and is axially connected in the space of the case 09. The clutch ring 07 has ratchet teeth 071 that are located at a side facing the clutch teeth 082 of the clutch 08. The clutch ring 07 has inner teeth 072 disposed at an inner periphery thereof to engage with the planet gears 10.

The adjusting members 03 are members to move the washer 04. Each of the adjusting members 03 has a protrusion portion 031 and a contact portion 032 on two ends thereof. The adjusting member 03 extends through the through hole 091 of the case 09. The contact portion 032 is contacted with the washer 04 and the protrusion portion 031 is connected with the second torque member 02.

After the washer 04, the pins 06, the springs 05, the clutch 08, the clutch ring 07 and the adjusting members 03 are installed into the case 09, a rear end of the case 09 is covered by a motor board 11. The sun gear 12 connected to the motor (not shown in drawings) extends through the motor board 11 and enters into the case 09 and is engaged with the planet gears 10.

The first torque member 01 has a transmission gear 13 disposed inside thereof. The sun gear 12 is engaged with the planet gears 05 and the transmission gear 13 is connected to an output shaft of the power tool through gears. The first torque member 01 is connected to the case 09 and the second torque member 02 is connected to an outside of the first torque member 01. The adjusting members 03 are engaged with the inner periphery of the second torque member 02, so that when the second torque member 02 is rotated, the adjusting members 03 move axially.

Figure 2A:
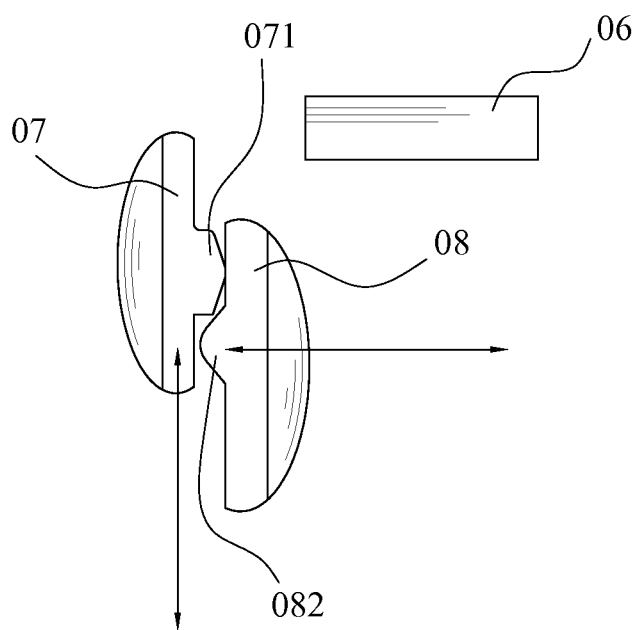
FIG. 2A is a schematic view showing the clutch device according to the present invention, wherein the pins do not extend through the clutch and clutch teeth of the clutch are disengaged from ratchet teeth of a clutch ring.

As shown in FIGS. 2 and 2A, the second torque member 02 is first rotated to move the adjusting members 03 forward, and the springs 05 push the washer 04 forward axially so that the pins 06 move with the washer 04 and move away from the notches 081 of the clutch 08. The sun gear 12 is driven by the motor to rotate. When the planet gears 10 are driven by the sun gear 12 to rotate, the transmission gear 13 is also driven to rotate and provides an output torque to the output shaft. If the output torque of the output shaft is smaller than the input torque of the main shaft, the clutch 08 is restricted in the case 09 and the clutch ring 07 is rotated by the sun gear 12 and the planet gears 10. Therefore, the ratchet teeth 072 of the clutch ring 07 are disengaged from and pass over the clutch teeth 082 of the clutch 08 so that the clutch device is in an idle state. It prevents the output torque from exceeding a predetermined value.

Figure 3:
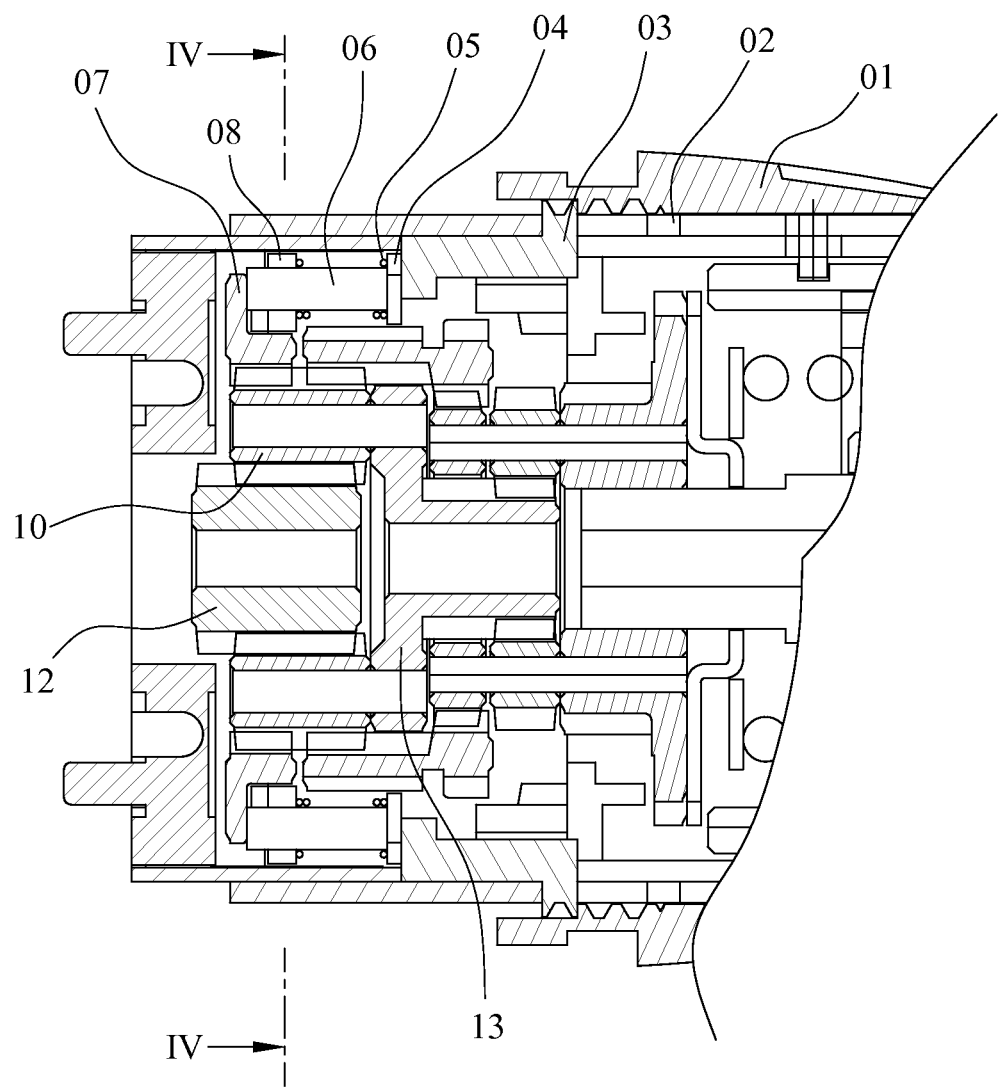
FIG. 3 is a detailed cross sectional view showing the clutch device according to the present invention, wherein the pins extend through the clutch and contact with the clutch ring.
Figure 3A:
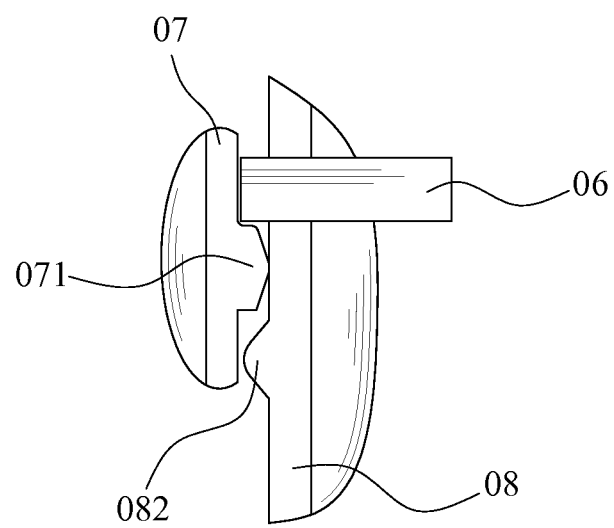
FIG. 3A is a schematic view showing the clutch device according to the present invention, wherein the pin extend through the clutch and contact with the clutch ring, the clutch teeth of the clutch are engaged with the ratchet teeth of the clutch ring.

Referring to FIGS. 3 and 3A, the power tool is switched to a drill mode to drill objects. The second torque member 02 is rotated reversely to move the adjusting members 03 backward. The springs 05 are compressed by the washer 04; the pins 06 are moved and extend through the notches 081 of the clutch 08. The free ends of the pins 06 contact with the clutch ring 07. The sun gear 12 is driven by the motor and the planet gears 10 are rotated by the sun gear 12. Because the clutch ring 07 is fixed by the pins 06 and cannot rotate, as shown in FIG. 3A, so that the planet gears 10 directly drives the transmission gear 13 to output the maximum torque to drill objects.

Although the present invention has been described with reference to the preferred embodiment thereof, it is apparent to those skilled in the art that a variety of modifications and changes may be made without departing from the scope of the present invention which is intended to be defined by the appended claim.

What is claimed is:

1. A clutch device, comprising:

a case having a space defined therein, a plurality of grooves axially defined in an inner surface of the case and a plurality of through holes defined through the case;

a washer axially connected in the space of the case and having a plurality of blocks extending from a periphery thereof and a plurality of apertures defined therethrough and arranged around a circle, the blocks capable of being engaged with the grooves of the case;

a plurality of pins corresponding to the aperture of the washer, each of the pins having a first end fixed with the aperture;

a plurality of springs respectively mounted to the pins;

a clutch axially connected to the space of the case and having a plurality of clutch teeth on a side surface thereof, the clutch teeth being arranged around a circle, a plurality of notches defined in an outer periphery of the clutch and located corresponding to the apertures of the washer, a plurality of projections extending radially from the outer periphery of the clutch and capable of being engaged with the grooves of the case, each of the pins having a second end facing the clutch, the springs located between the clutch and the washer;

a clutch ring axially connected in the space of the case and having ratchet teeth that are located at a side facing the clutch teeth of the clutch and are arranged around a circle, the clutch ring having inner teeth disposed at an inner periphery thereof;

a plurality of adjusting members, each of the adjusting members having a protrusion portion and a contact portion on two ends thereof, the adjusting members extending through the through holes in the case and the contact portions contacting with the washer;

a first torque member connected to the case;

a second torque member connected to an outside of the first torque member and the adjusting members connected with an inner periphery of the second torque member, the adjusting members axially moving when the second torque member is rotated;
a plurality of planet gears engaged with the inner teeth of the clutch ring;
a transmission gear engaged with the planet gears; and
a sun gear connected to a motor and engaged with the planet gears.

2. The device as claimed in claim 1, wherein the projections of the clutch are arranged in pairs and located at both sides of the notches.

* * * * *